United States Patent
Carro et al.

(10) Patent No.: US 12,316,537 B2
(45) Date of Patent: May 27, 2025

(54) MULTI-DIMENSIONAL ROUTING ARCHITECTURE

(71) Applicant: Arm Limited, Cambridge (GB)

(72) Inventors: Alejandro Rico Carro, Austin, TX (US); Saurabh Pijuskumar Sinha, Schertz, TX (US); Douglas James Joseph, Leander, TX (US); Tiago Rogerio Muck, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/396,452

(22) Filed: Aug. 6, 2021

(65) Prior Publication Data
US 2023/0037714 A1   Feb. 9, 2023

(51) Int. Cl.
| H04L 45/58 | (2022.01) |
| G06F 15/78 | (2006.01) |
| H04L 43/0852 | (2022.01) |
| H04L 49/109 | (2022.01) |

(52) U.S. Cl.
CPC ........ H04L 45/583 (2013.01); G06F 15/7825 (2013.01); H04L 43/0852 (2013.01); H04L 49/109 (2013.01)

(58) Field of Classification Search
CPC . H04L 45/583; H04L 43/0852; H04L 49/109; G06F 15/7825
USPC ....................................................... 370/400
See application file for complete search history.

(56) References Cited

U.S. PATENT DOCUMENTS

| 2014/0254388 A1* | 9/2014 | Kumar ................ H04L 47/2425 370/235 |
| 2015/0117261 A1* | 4/2015 | Kumar ................ H04L 41/145 370/255 |
| 2017/0125383 A1* | 5/2017 | Liu ........................... G11C 8/12 |
| 2018/0203963 A1* | 7/2018 | Eghbal ................ G06F 30/3308 |
| 2021/0344618 A1* | 11/2021 | Zheng ................ H04L 41/0813 |
| 2022/0139883 A1* | 5/2022 | DeLaCruz .......... H01L 25/0657 257/777 |

OTHER PUBLICATIONS

Jerger et al. (NoC Architectures for Silicon Interposer), Dec. 2014, IEEE, 458-470 pages (Year: 2014).*
Jerger et al. (NoC Architectures for Silicon Interposer), Dec. 2014, IEEE, 458-470 pages (Year:2014) (Year: 2014).*
Young Seo Lee, "Monolithic 3D stacked multiply-accumulate units", Jan. 2021, pp. 183-189 (Year: 2021).*
Jung, et al.; Ruche Networks: Wire-Maximal, No Fuss NoCs; 14th IEEE/ACM International Symposium on Networks-on-Chip (NOCS); Sep. 2020.

(Continued)

*Primary Examiner* — Jutai Kao
*Assistant Examiner* — Syed M Bokhari
(74) *Attorney, Agent, or Firm* — Pramudji Law Group PLLC; Ari Pramudji (57) ABSTRACT

Various implementations described herein refer to a device having a multi-layered logic structure with multiple layers including a first layer and a second layer arranged vertically in a stacked configuration. The device may have a first network that links nodes together in the first layer. The device may have a second network that links the nodes in the first layer together by way of the second layer so as to reduce latency related to data transfer between the nodes.

20 Claims, 6 Drawing Sheets

(56) References Cited

OTHER PUBLICATIONS

DALLY; Express Cubes: Improving the Performance of K-ARY N-Cube Interconnection Networks; IEEE Transactions on Computers; vol. 40, No. 9; Sep. 1991.
PCT International Search Report and Written Opinion; PCT/GB2022/051926; Oct. 14, 2022.
Jerger, et al.; NoC Architectures for Silicon Interposer Systems: Why pay for more wires when you can get them (from your interposer) for free?; 2014 47th Annual IEEE / ACM International Symposium on Microacrchitecture; pp. 458-470; Dec. 13, 2014. DOI: 10.1109/MICRO.2014.61.
Park, et al.; Mira: A Multi-Layered On-Chip Interconnect Router Architecture; 2008 International Symposium on Computer Architecture; pp. 251-261; Jun. 2008. DOI: 10.1109/ISCA.2008.13.
Carloni, et al,; Networks-on-Chip in Emerging Interconnect Paradigms: Advantages and Challenges; 2009 3rd ACM/IEEE International Symposium on Networks-on-Chip; pp. 93-102; May 10, 2009.

* cited by examiner

510 — provide a multi-layered logic structure by joining multiple layers together including a first layer and a second layer arranged vertically in a stacked configuration 520 — link nodes together with a first network disposed in the first layer 530 — link the nodes together with a second network disposed in the second layer so as to reduce latency related to data transfer between the nodes

FIG. 5

MULTI-DIMENSIONAL ROUTING ARCHITECTURE

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional circuit designs, three-dimensional (3D) integration technology can enable formation of multi-chip processors with multi-layered bonding technologies, which can increase the amount of logic and wires available for computation, storage and communication on multi-chip processors. In some cases, two-dimensional (2D) mesh topology can be used in some scalable processors because this technique allows for application of a tiled design that can be instantiated for a given power, performance and area (PPA) target using a given mesh size and replicating a given number of tiles. However, in some implementations, 2D mesh typically suffers from congestion in the middle and can introduce additional latency due to paths having to cross a significant number of routers. Thus, there exists a need to improve network-on-chip (NoC) designs so as to reduce latency, improve bandwidth, and in some instances, enhance power, performance and area (PPA) targets.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to multi-dimensional (3D) express link routing schemes and techniques for supporting 3D express link applications in reference to multi-layered physical circuit designs. Various applications related to 3D on-chip routing schemes and techniques may be used to improve yield and power, performance and area (PPA) in multi-layered structures and various related physical circuit designs.

Various implementations described herein provide for extending the topology of a first die using the metal layers of a second die. One implementation described herein refers to the addition of express links to a 2D mesh that may be used to couple non-neighbor router logic by way of a multi-layered structure. The addition of 3D express links may be used to increase bisection bandwidth and reduce latency for message packets that travel through the express links as opposed to local links. Also, the addition of 3D express links may enable a physical design such as express links to become feasible. In various implementations, local links and routers remain in a first die, while express links connect through 3D connections to the metal layers in a second die. The express links may then travel a particular distance until the express links cross through the 3D connections back to the first die and connect to the destination router. Also, various implementations described herein provide for face-to-face bonding of multiple layers so as to further improve efficiency of physical designs.

Therefore, various implementations described herein provide for 3D express links that reduce latency in multi-layered physical structures, wherein improved physical designs alleviate the high latency from high average data-hop counts in 2D mesh structures. Further, the improved physical designs alleviate congested hot spots formed in the middle of 2D mesh structures by providing higher bandwidth through the 3D express links.

Various implementations of providing various multi-dimensional (3D) express link architecture will be described herein with reference to FIGS. 1-4.

Figure 1:
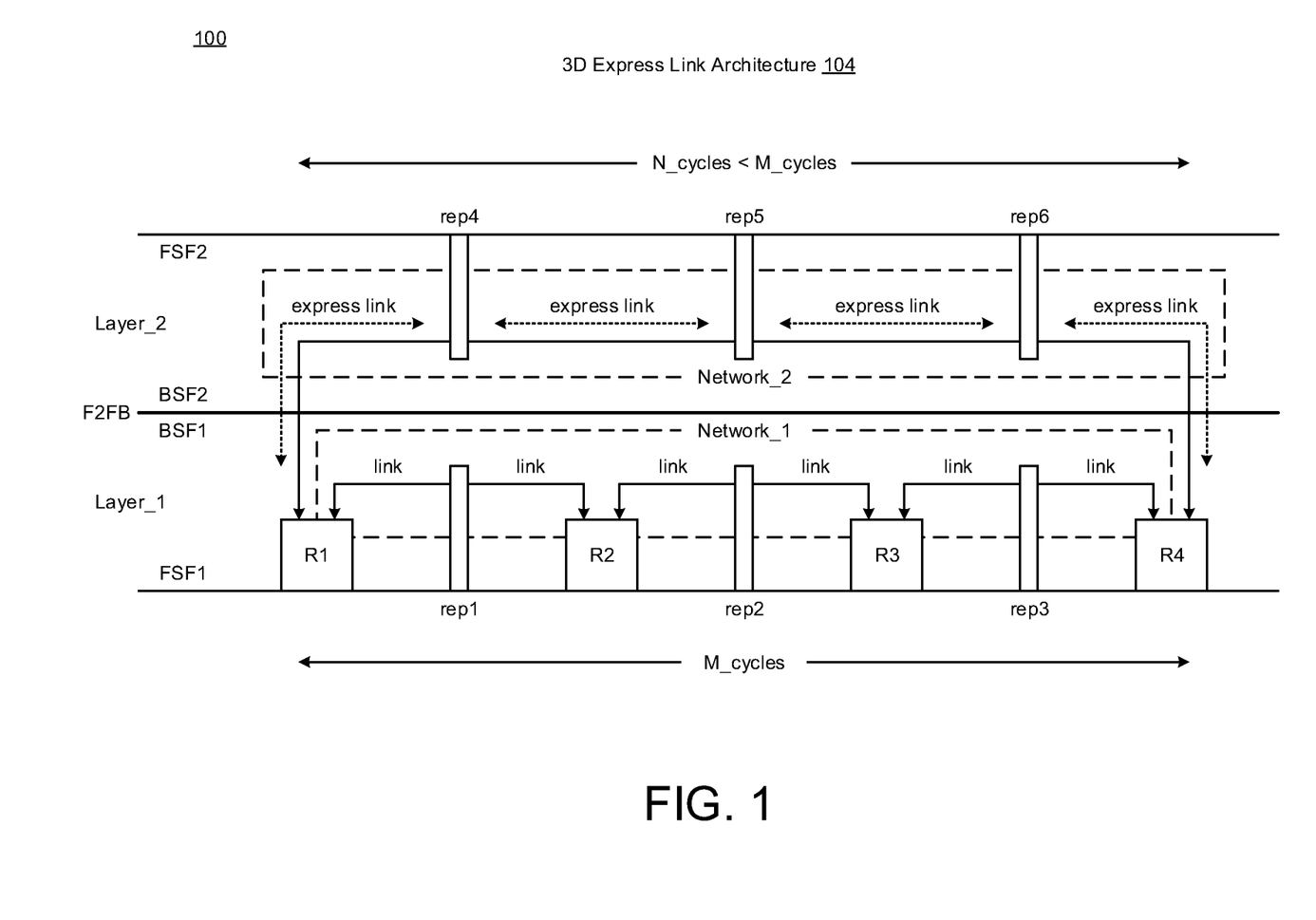
FIGS. 1-2, 3A, 3B, and 4 illustrate diagrams of multi-dimensional (3D) express link architecture in accordance with various implementations described herein.
Figure 2:
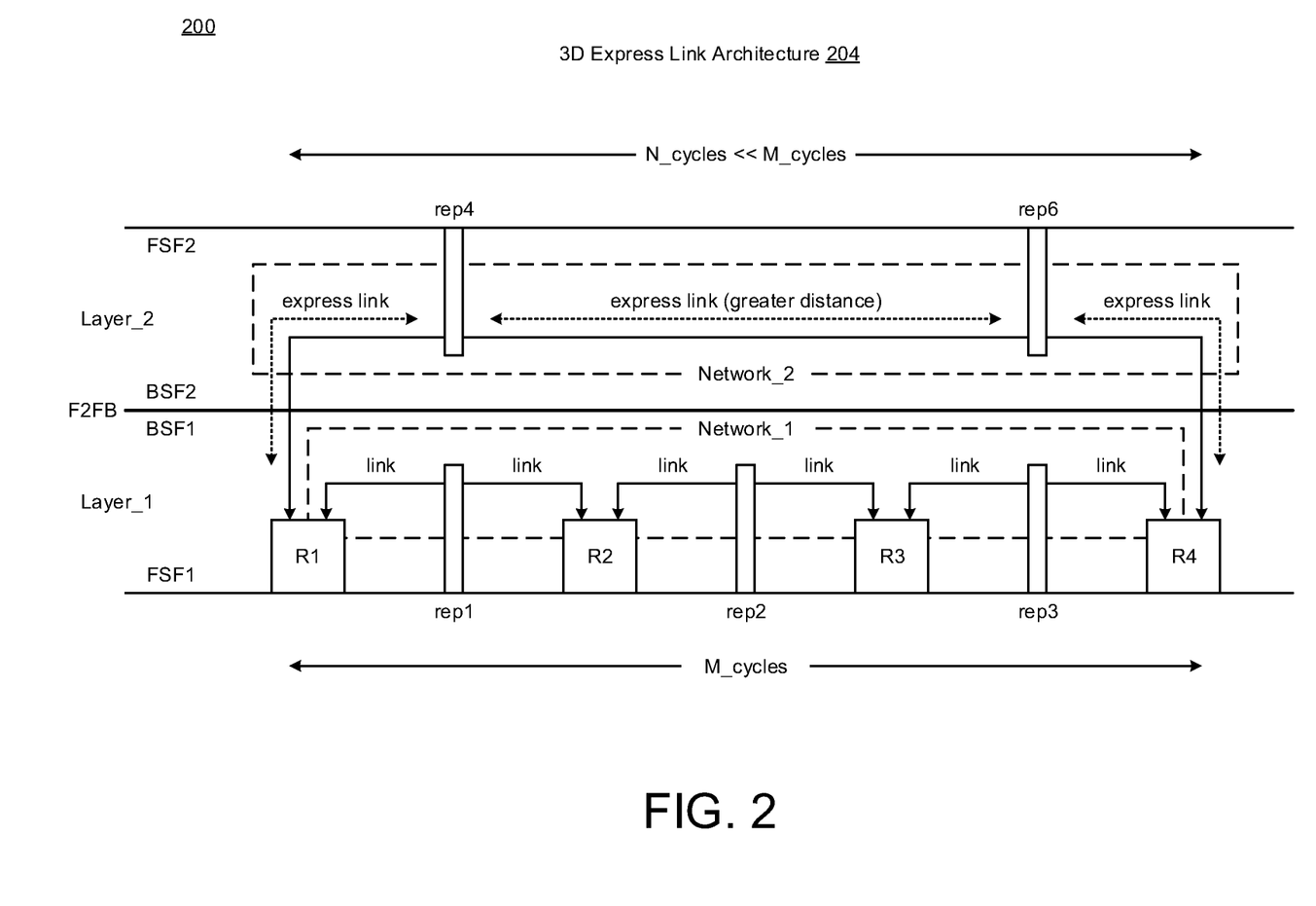
Figure 3A:
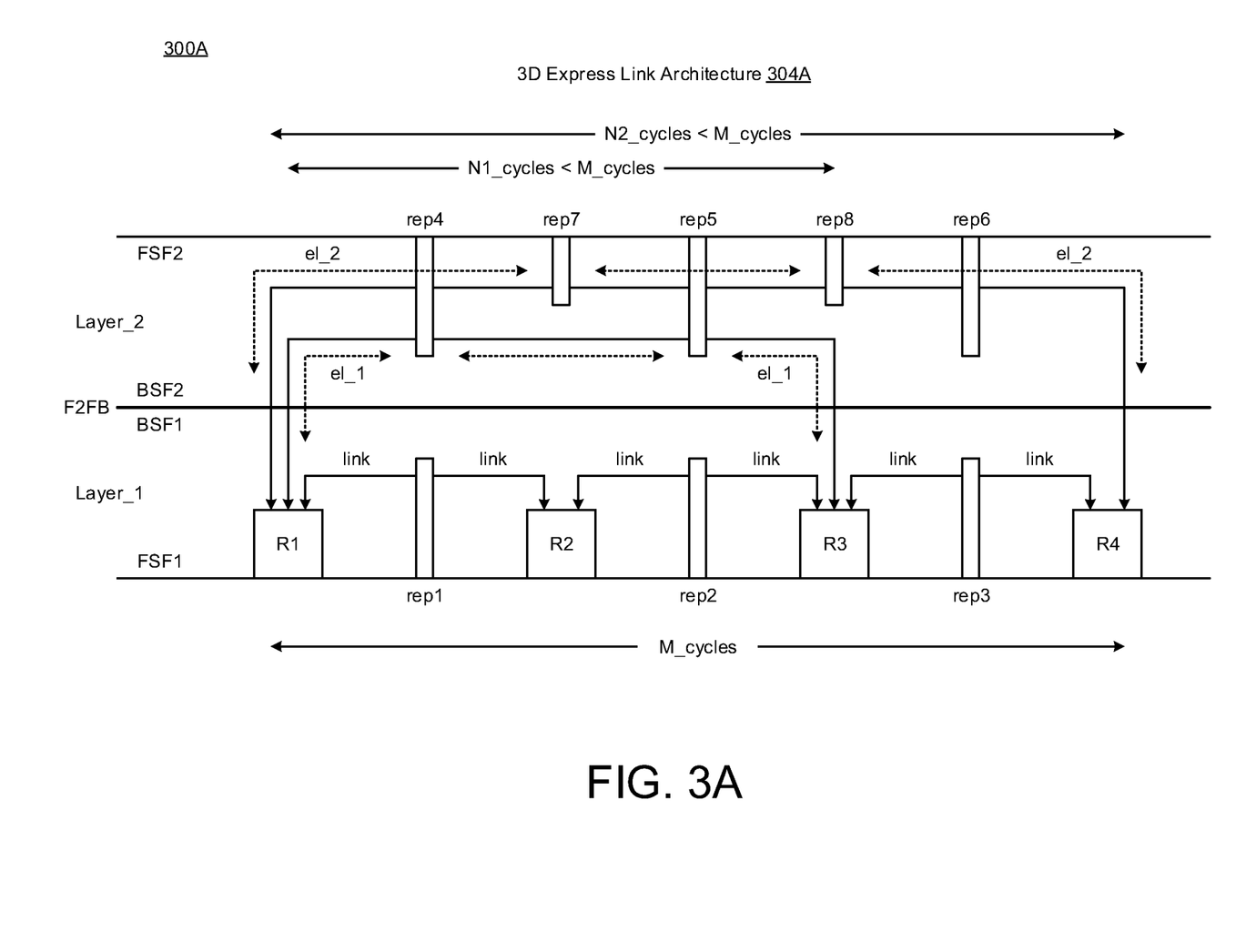
Figure 3B:
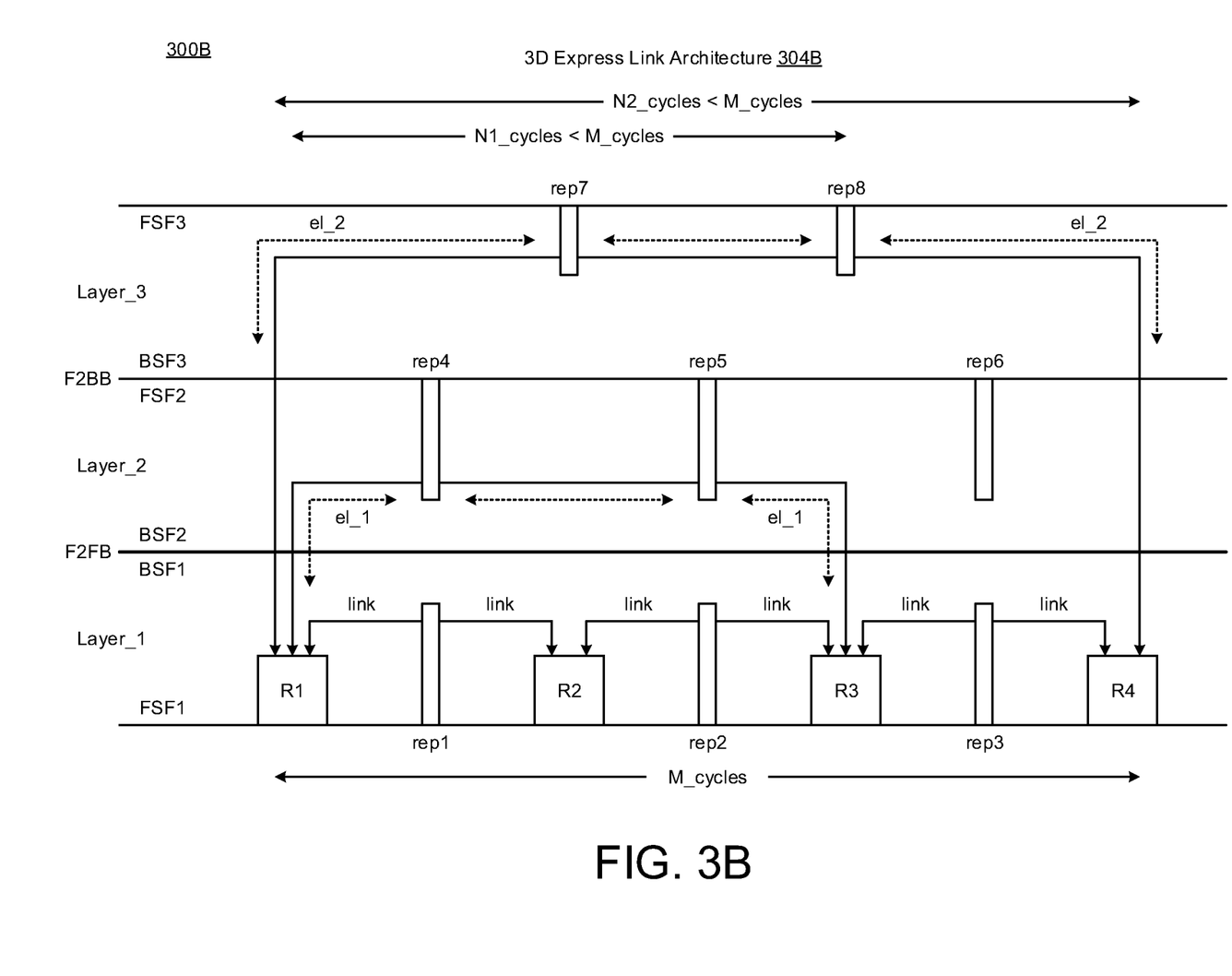
Figure 4:
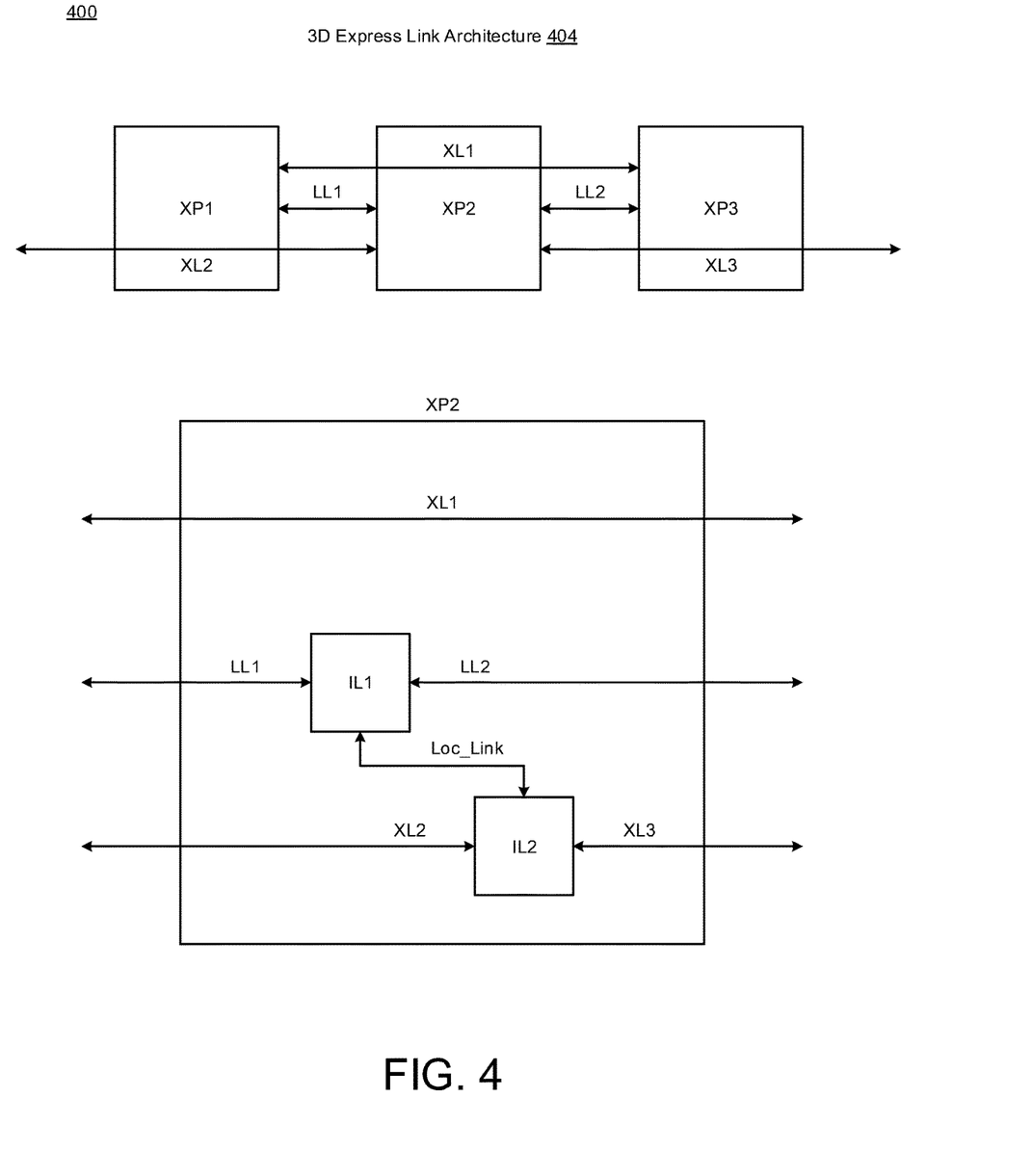

FIGS. 1-4 illustrate diagrams of multi-dimensional (3D) express link architecture in accordance with various implementations described herein. In particular, FIG. 1 shows a diagram 100 of 3D express link architecture 104, FIG. 2 shows a diagram 200 of 3D express link architecture 204, FIG. 3A shows a diagram 300A of 3D express link architecture 304A, FIG. 3B shows a diagram 300B of 3D express link architecture 304B, and FIG. 4 shows a diagram 400 of 3D express link architecture 404.

In various implementations, the 3D express link architecture may be implemented as a system or a device having various integrated circuit (IC) components that are arranged and coupled together as an assemblage or a combination of parts that provide for physical circuit designs and related structures. In some instances, a method of designing, providing, fabricating and/or manufacturing the 3D express link architecture as an integrated system or device may involve use of various IC circuit components described herein so as to thereby implement various related fabrication schemes and techniques associated therewith. Also, the 3D express link architecture may be integrated with computing circuitry and components on a single chip, and further, the 3D express link architecture may be implemented and/or incorporated in various embedded systems for automotive, electronic, mobile, server and also Internet-of-things (IoT) applications, including remote sensor nodes.

As shown in FIG. 1, the multi-dimensional (3D) express link architecture 104 may refer to 3D on-chip routing architecture that may be implemented with a multi-layered logic structure having multiple layers including a first layer (Layer_1) and a second layer (Layer_2) arranged vertically in a stacked configuration. The multi-layered logic structure may include a first network (Network 1) that links nodes (e.g., R1, R2, R3, R4) together in the first layer (Layer_1). The multi-layered logic structure may include a second network (Network_2) that express links some of the nodes (e.g., R1, R4) in the first layer (Layer_1) together by way of the second layer (Layer_2) so as to reduce latency related to data transfer between the nodes (e.g., R1, R4) linked together with the express links. For instance, data transfer between the nodes (e.g., R1, R2, R3, R4) linked together in the first network (Network 1) may refer to a data latency of M_cycles, and in contrast, data transfer between the nodes (e.g., R1, R4) linked together by way of the second network (Network_2) may refer to another different data latency of N_cycles that is less than the M_cycles, wherein N_cycles<M_cycles.

In some implementations, in reference to the first network (Network 1), a first node (R1) may be linked to a fourth node (R4) in the first layer (Layer_1) by way of links coupling a second node (R2) and a third node (R3). Otherwise, in reference to the second network (Network_2), the first node (R1) may be directly linked to the fourth node (R4) by way of the express links in the second layer (Layer_2). Also, each node (e.g., R1, R2, R3, R4) includes router logic associated therewith, and each node is separate and distinct from each other node in first layer (Layer_1). In addition, the first layer (Layer_1) may have repeater logic (e.g., rep1, rep2, rep3) that may be used to assist with data transfer between the nodes (e.g., R1, R2, R3, R4) that are linked together to form the first network (Network 1). Further, the second layer (Layer_2) may have repeater logic (e.g., rep4, rep5, rep6) that may be used to assist with data transfer between the nodes (e.g., R1, R4) that are linked together to form the second network (Network_2), which reduces latency related to data transfer between the nodes (e.g., R1, R4) linked together with the express links.

In some implementations, the second layer (Layer_2) may be separate and distinct from the first layer (Layer_1), and also, the second layer (Layer_2) may be disposed on the first layer (Layer_1). Also, each layer of the multiple layers (Layer_1, Layer_2) may have a frontside face (FSF) and a backside face (BSF), and the second layer (Layer_2) is joined to the first layer (Layer_1) with a face-to-face bond (F2FB).

In some implementations, each node (e.g., R1, R2, R3, R4) that inserts a message packet into the first network (Network 1) or the second network (Network_2) may decide whether to inject the message packet through the link in the first network (Network 1) or the express link in the second network (Network_2) in a randomized or reactive manner based on a signal that informs the node (e.g., R1, R2, R3, R4) that congestion is present in the first network (Network 1) or the second network (Network_2).

In some implementations, the first network (Network 1) may refer to a first on-chip network of first data paths (or links) that are formed in the first layer (Layer_1), and the second network (Network_2) may refer to a second on-chip network of second data paths (or express links) that are formed in the second layer (Layer_2). Also, the first data paths (or links) may be separate and distinct from the second data paths (or express links). As described herein, the second network (Network_2) transfers data between the nodes (e.g., R1, R4) with fewer timing cycles than the first network (Network 1), such that N_cycles<M_cycles, so as to reduce latency related to data transfer between the nodes (e.g., R1, R4).

As shown in FIG. 2, the multi-dimensional (3D) express link architecture 204 may refer to similar 3D on-chip routing architecture of FIG. 1 that may be implemented with the multi-layered logic structure having multiple layers including the first layer (Layer_1) and the second layer (Layer_2) arranged vertically in a stacked configuration. The multi-layered logic structure may include the first network (Network 1) that links nodes (e.g., R1, R2, R3, R4) together in the first layer (Layer_1). The multi-layered logic structure may include the second network (Network_2) that express links some of the nodes (e.g., end nodes R1, R4) in the first layer (Layer_1) together by way of the second layer (Layer_2) so as to reduce latency related to data transfer between the nodes (e.g., end nodes R1, R4) linked together with the express links over greater distances. For instance, data transfer between the nodes (e.g., R1, R2, R3, R4) linked together in the first network (Network 1) may refer to a data latency of M_cycles, and in contrast, data transfer between the nodes (e.g., R1, R4) linked together by way of the second network (Network_2) may refer to another different data latency of N_cycles that is much less than the M_cycles, wherein N_cycles<<M_cycles.

In some implementations, in the first network (Network 1), the first node (R1) may be linked to the fourth node (R4) in the first layer (Layer_1) by way of the data paths (or links) coupling the second node (R2) and the third node (R3). Otherwise, in the second network (Network_2), the first node (R1) may be directly linked to the fourth node (R4) by way of the express links in the second layer (Layer_2) over greater distances. Also, each node (e.g., R1, R2, R3, R4) includes router logic associated therewith, and each node is separate and distinct from each other node in first layer (Layer_1). Also, the first layer (Layer_1) may have repeater logic (e.g., rep1, rep2, rep3) that may be used to assist with data transfer between the nodes (e.g., R1, R2, R3, R4) that are linked together to form the first network (Network 1). Further, the second layer (Layer_2) may have repeater logic (e.g., rep4, rep6) that may be used to assist with data transfer between the nodes (e.g., R1, R4) at greater distances that are linked together to form the second network (Network_2), which reduces latency related to data transfer between the nodes (e.g., R1, R4) linked together with the express links at even greater distances, wherein N_cycles<<M_cycles.

As shown in FIG. 3A, the multi-dimensional (3D) express link architecture 304A may refer to similar 3D on-chip routing architecture of FIGS. 1-2 that may be implemented with a multi-layered logic structure (or on-chip network structure) having multiple layers including the first layer or level (Layer_1 or Level_1) and the second layer or level (Layer_2 or Level_2) arranged vertically in a stacked configuration. The multi-layered logic structure may include the first network (Network 1) that links nodes (e.g., R1, R2, R3, R4) together in the first layer (Layer_1). The multi-layered logic structure may include the second network (Network_2) as a multi-link network (e.g., el_1, el_2) that express links some nodes (e.g., R1-to-R3 and R1-to-R4) in the first layer (Layer_1) together by way of the second layer (Layer_2) so as to reduce latency related to data transfer between the nodes (e.g., R1-to-R3 and R1-to-R4) linked together with the multi-link express links (e.g., el_1, el_2).

In some instances, data transfer between the nodes (e.g., R1, R2, R3, R4) linked together in the first network (Network 1) may refer to the data latency of M_cycles. In contrast, data transfer between the nodes (e.g., R1-to-R3) in a first express link (el_1) that is linked together by way of the second network (Network_2) may refer to another different data latency of N1_cycles that is less than the M_cycles, wherein N1_cycles<M_cycles. Also, in reference to another separate and distinct channel, data transfer between the nodes (e.g., R1-to-R4) in a second express link (el_2) that is linked together by way of the second network (Network_2) may also refer to another different data latency of N2_cycles that is also less than the M_cycles, wherein N2_cycles<M_cycles.

In some implementations, in the first network (Network 1), the first node (R1) may be linked to the fourth node (R4) in the first layer (Layer_1) by way of the data paths (or links) coupling the second node (R2) and the third node (R3). Otherwise, in the second network (Network_2), the first node (R1) may be directly linked to the third node (R3) by way of the first express link (el_1) in the second layer (Layer_2). Also, in the second network (Network_2), the first node (R1) may be directly linked to the fourth node (R4) by way of the second express link (el_2) in the second layer (Layer_2).

Also, each node (e.g., R1, R2, R3, R4) includes router logic associated therewith, and each node is separate and distinct from each other node in first layer (Layer_1). Also, the first layer (Layer_1) may have repeater logic (e.g., rep1, rep2, rep3) that may be used to assist with data transfer between the nodes (e.g., R1, R2, R3, R4) that are linked together to form the first network (Network 1). Further, the second layer (Layer_2) may have repeater logic (e.g., rep4, rep5, rep6, rep7, rep8) that may be used to assist with data transfer between the nodes (e.g., R1-to-R3 and R1-to-R4) at various distances that are linked together to form the second network (Network_2). In various instances, the express link channels (el_1, el_2) reduce latency related to data transfer between various nodes (e.g., R1-to-R3 and R1-to-R4) that are linked together with the express link channels (e.g., R1-to-R3 and R1-to-R4), wherein N1_cycles<M_cycles, and wherein N2_cycles<M_cycles.

As shown in FIG. 3B, the multi-dimensional (3D) express link architecture 304B may refer to similar 3D on-chip routing architecture of FIG. 3A that may be implemented with a multi-layered logic structure (or on-chip network structure) having multiple layers including the first layer or level (Layer_1 or Level_1), the second layer or level (Layer_2 or Level_2) and a third layer or level (Layer_3 or Level_3) arranged vertically in a stacked configuration. The multi-layered logic structure may include the first network (Network 1) that links nodes (e.g., R1, R2, R3, R4) together in the first layer (Layer_1). The multi-layered logic structure may include the second network (Network_2) as a multi-link network (e.g., el_1) that express links some nodes (e.g., R1-to-R3) in the first layer (Layer_1) together by way of the second layer (Layer_2) so as to reduce latency related to data transfer between the nodes (e.g., R1-to-R3) linked together with the multi-link express links (e.g., el_1). Also, the multi-layered logic structure may include another network as a multi-link network (e.g., el_2) that express links some nodes (e.g., R1-to-R4) in the first layer (Layer_1) together by way of the third layer (Layer_3) so as to reduce latency related to data transfer between the nodes (e.g., R1-to-R4) linked together with the multi-link express links (e.g., el_2).

In some implementations, the first layer (Layer_1) may have repeater logic (e.g., rep1, rep2, rep3) that may be used to assist with data transfer between the nodes (e.g., R1, R2, R3, R4) that are linked together to form the first network (Network 1). The second layer (Layer_2) may have repeater logic (e.g., rep4, rep5) that may be used to assist with data transfer between the nodes (e.g., R1, R3) that are linked together to form the second network (Network_2), which reduces latency related to data transfer between the nodes (e.g., R1, R3) linked together with the express links. The third layer (Layer_3) may have repeater logic (e.g., rep7, rep8) that may be used to assist with data transfer between the nodes (e.g., R1, R4) that are linked together to form another network that reduces latency related to data transfer between the nodes (e.g., R1, R4) linked together with the express links from node (R1) to node (R4) through multiple layers.

In some implementations, the third layer (Layer_3) may be separate and distinct from the first and second layers (Layer_1, Layer_2), wherein the third layer (Layer_3) may be disposed on the second layer (Layer_2), and wherein the second layer (Layer_2) may be disposed on the first layer (Layer_1). In addition, each layer of the multiple layers (Layer_1, Layer_2, Layer_3) may include a frontside face (FSF) and a backside face (BSF), wherein the second layer (Layer_2) may be joined to the first layer (Layer_1) with a face-to-face bond (F2FB), and wherein the third layer (Layer_3) may be joined to the second layer (Layer_2) with a face-to-back bond (F2BB). The first layer (Layer_1) may include a FSF1 and a BSF1, the second layer (Layer_2) may have a FSF2 and a BSF2, and the third layer (Layer_3) may have a FSF3 and a BSF3. Various other FSFB and FSBB configurations may be used to achieve similar features, characteristics, behaviors and/or results.

FIG. 4 shows a diagram 400 of 3D express link architecture 404 in accordance with various implementations described herein.

In various implementations, the 3D express link architecture may be implemented as a system or a device having various integrated circuit (IC) components that are arranged and coupled together as an assemblage or a combination of parts that provide for physical circuit designs and related structures. In some instances, a method of designing, providing, fabricating and/or manufacturing the 3D express link architecture as an integrated system or device may involve use of various IC circuit components described herein so as to thereby implement various related fabrication schemes and techniques associated therewith. Also, the 3D express link architecture may be integrated with computing circuitry and components on a single chip, and further, the 3D express link architecture may be implemented and/or incorporated in various embedded systems for automotive, electronic, mobile, server and also Internet-of-things (IoT) applications, including remote sensor nodes.

As shown in FIG. 4, the multi-dimensional (3D) express link architecture 404 may refer to 3D on-chip routing architecture that may be implemented with router logic devices or circuits (e.g., XP1, XP2, XP3) linked together with various data paths, such as, e.g., various local link connections (e.g., LL1, LL2,Loc_Link) and/or express link connections (e.g., XL1, XL2, XL3). For instance, first router logic XP1 may be coupled to third router logic XP3 by way of express link XL1, and the first router logic XP1 may be coupled to second router logic XP2 by way of local link LL1. Also, the second router logic XP2 may be coupled to third router logic XP3 by way of local link LL2, and the second router logic XP2 may be coupled to other router logic by way of express links XL2, XL3. Moreover, in some instances, the second router logic XP2 may include various internal logic, such as, e.g., IL1 and IL2, that are coupled together with local link (Loc_Link).

Figure 5:
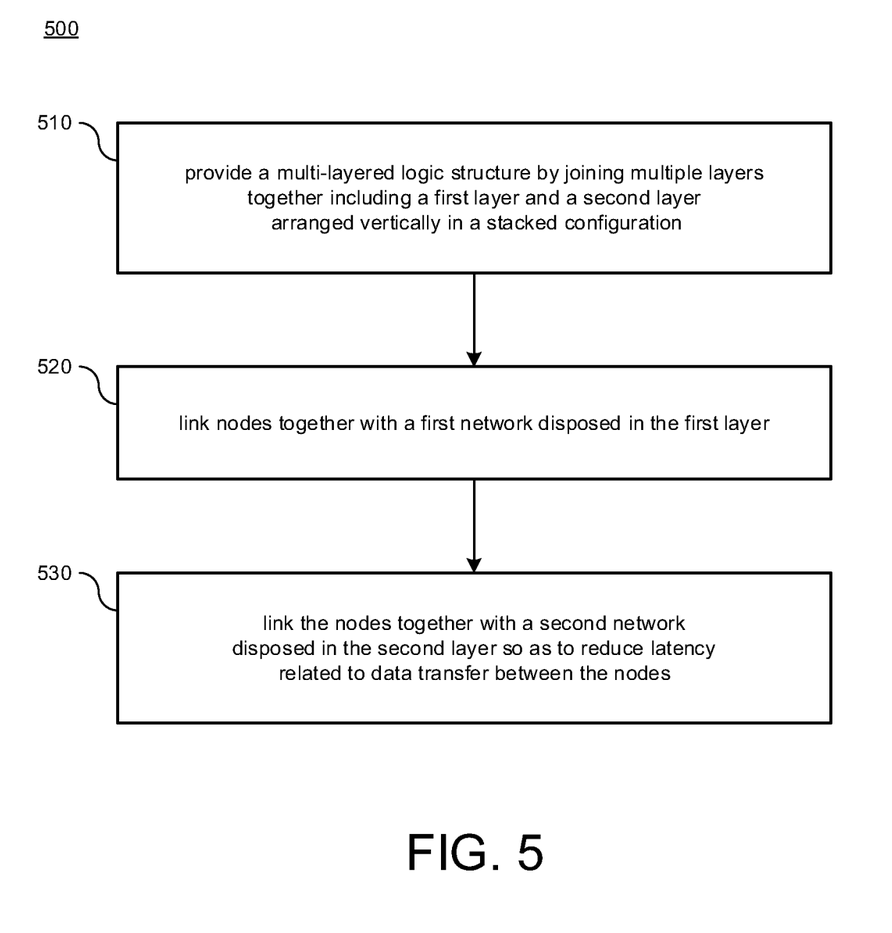
FIG. 5 illustrates a diagram of a method for providing multi-dimensional express link architecture in accordance with various implementations described herein.

FIG. 5 illustrates a diagram of a method 500 for providing multi-dimensional (3D) express link architecture in accordance with implementations described herein. As described herein, method 500 may be used to provide 3D on-chip routing between network nodes.

It should be understood that even though method 500 indicates a particular order of operation execution, in some cases, various portions of operations may be executed in a different order, and on different systems. In other cases, additional operations and/or steps may be added to and/or omitted from method 500. Also, method 500 may be implemented in hardware and/or software. For instance, if implemented in hardware, method 500 may be implemented with various components and/or circuitry, as described in FIGS. 1-3. Also, in other instances, if implemented in software, method 500 may be implemented as a program or software instruction process configured for providing multi-dimensional (3D) express link architecture, as described herein. Further, if implemented in software, instructions related to implementing method 500 may be stored in memory and/or a database. Therefore, in various implementations, a computer or various other types of computing devices with a processor and memory may be configured to perform method 500.

As described in reference to FIG. 5, the method 500 may be used for fabricating and/or manufacturing, or causing to be fabricated and/or manufactured, an integrated circuit (IC) that implements various layout schemes and techniques in physical design as described herein so as to thereby provide multi-dimensional (3D) express link architecture using various related devices, components and/or circuitry as described herein.

At block 510, method 500 may provide a multi-layered logic structure by joining multiple layers together including a first layer and a second layer that are arranged vertically in a stacked configuration. At block 520, method 500 may link multiple nodes together with a first network disposed in the first layer. Also, at block 530, method 500 may link the multiple nodes together with a second network disposed in the second layer so as to reduce latency related to data transfer between the nodes.

In some implementations, the second layer may be separate and distinct from the first layer, and the second layer may be disposed above the first layer, and also, the second layer may be joined to the first layer with a face-to-face bond (F2FB). In some instances, each layer of the multiple layers may have a frontside face and a backside face, and a backside face of the first layer may be joined to a backside face of the second layer so as to form the face-to-face bond (F2FB) between the first layer and the second layer.

In some implementations, the nodes may be configured to insert data in the first network or the second network, and also, reducing latency related to data transfer between the nodes may be associated with load balancing between multiple networks including the first network and the second network. Also, in various implementations, each node that inserts a message packet into the first network or the second network may decide whether to inject the message packet through a link in the first network or the second network in a randomized or reactive manner based on a signal that informs the node that congestion is present in the first network or the second network.

In some implementations, the first network may refer to a first on-chip network of first data paths that are formed in the first layer, and also, the second network may refer to a second on-chip network of second data paths that are formed in the second layer. Also, the first data paths may be separate and distinct from the second data paths. In some instances, the second network may transfer data between the nodes with fewer timing cycles than the first network so as to reduce latency related to data transfer between the nodes.

For instance, in reference to FIG. 1, the nodes (e.g., R1, R2, R3, R4) may include the first node (R1), the second node (R2), the third node (R3) and also the fourth node (R4), wherein each node may have router logic associated therewith. Also, each node is separate and distinct from each other node in first layer (Layer_1). For instance, the first node (R1) and the fourth node (R4) are separate and distinct from the second node (R2) and the third node (R3), wherein the second and third nodes (R2, R3) are disposed between the first and fourth nodes (R1, R4), which may be referred to as end nodes. The first network (Network 1) may have a first data path (or links) formed in the first layer (Layer_1) that passes from the first node (R1) to the fourth node (R4) by way of the second node (R2) and the third node (R3), and the second network (Network_2) may have a second data path (or express links) formed in the second layer (Layer_2) that passes from the first node (R1) to the fourth node (R4) with reduced latency such that data transfer between the first router logic (R1) and the fourth router logic (R4) with the second data path (or express links) is faster than data transfer with the first data path (or links).

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device a multi-layered logic structure with multiple layers including a first layer and a second layer arranged vertically in a stacked configuration. The device may have a first network that links nodes together in the first layer. The device may have a second network that links the nodes in the first layer together by way of the second layer so as to reduce latency related to data transfer between the nodes.

Described herein are various implementations of a device having an on-chip network structure having multiple levels including a first level and a second level arranged vertically in a stacked configuration. The device may have a first data path formed in the first level that links nodes together including a first node and a second node that is separate from the first node. The device may have a second data path formed in the second level that links the nodes together by way of the second level so as to reduce latency related to data transfer between the nodes.

Described herein are various implementations of a method. The method may provide a multi-layered logic structure by joining multiple layers together including a first layer and a second layer arranged vertically in a stacked configuration. The method may link nodes together with a first network disposed in the first layer. The method may link the nodes together with a second network disposed in the second layer so as to reduce latency related to data transfer between the nodes.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
a multi-layered logic structure with multiple layers and multiple networks including a first layer having a first network and a second layer having a second network arranged vertically in a stacked configuration, wherein the first layer and the second layer include different logic structures; and
first repeater logic disposed between nodes in the first layer, wherein:
the first network links the nodes together in the first layer by way of a first data path that passes through the first layer,
the first repeater logic is used for data transfer between the nodes in the first layer,
the second network links the nodes in the first layer together by way of a second data path that bypasses the first data path in the first layer and passes through the second layer so as to reduce latency related to data transfer between the nodes, and
the second data path links the nodes with reduced latency such that data transfer between the nodes with the second data path is faster than data transfer between the nodes with the first data path, and
reducing latency related to data transfer between the nodes is associated with load balancing between the first network and the second network.

2. The device of claim 1, further comprising:
second repeater logic disposed in the second layer, wherein:
the second repeater logic is used for data transfer between two of the nodes,
the second layer is separate and distinct from the first layer,
the second layer is disposed on the first layer, and
the second data path is separate and distinct from the first data path.

3. The device of claim 2, further comprising:
third repeater logic disposed in a third layer, wherein:
the third repeater logic is used for data transfer between at least one different node than the second repeater logic, and
the nodes are configured to insert data in the first network or the second network.

4. The device of claim 1, wherein:
the first network refers to a first on-chip network having the first data path that is formed in the first layer,
the second network refers to a second on-chip network having the second data path that is formed in the second layer, and
the first data path is separate and distinct from the second data path.

5. The device of claim 1, wherein the second network transfers data between the nodes with fewer timing cycles than the first network so as to reduce latency related to data transfer between the nodes.

6. The device of claim 1, wherein:
the nodes include a first node and a second node that is separate and distinct from the first node,
the first node has first router logic disposed in the first layer, and
the second node has second router logic disposed in the first layer.

7. The device of claim 6, wherein:
the nodes include a third node that is separate and distinct from the first node and the second node,
the third node has third router logic disposed in the first layer between the first router logic in the first node and the second router logic in the second node.

8. A device comprising:
a multi-layered logic structure with multiple layers including a first layer and a second layer arranged vertically in a stacked configuration;
a first network that links nodes together in the first layer; and
a second network that links the nodes in the first layer together by way of the second layer so as to reduce latency related to data transfer between the nodes,
wherein the nodes are configured to insert data in the first network or the second network,
wherein reducing latency related to data transfer between the nodes is associated with load balancing between the first network and the second network, and
wherein each node that inserts a message packet into the first network or the second network decides whether to inject the message packet through a link in the first network or the second network in a randomized or reactive manner based on a signal that informs the node that congestion is present in the first network or the second network.

9. A device comprising:
a multi-layered logic structure with multiple layers including a first layer and a second layer arranged vertically in a stacked configuration;
a first network that links nodes together in the first layer; and
a second network that links the nodes in the first layer together by way of the second layer so as to reduce latency related to data transfer between the nodes,
wherein the nodes include a first node and a second node that is separate and distinct from the first node,
wherein the first node has first router logic disposed in the first layer,
wherein the second node has second router logic disposed in the first layer,
wherein the nodes include a third node that is separate and distinct from the first node and the second node,
wherein the third node has third router logic disposed in the first layer between the first router logic in the first node and the second router logic in the second node,
wherein the first network has a first data path formed in the first layer that passes from the first node to the second node by way of the third node, and
wherein the second network has a second data path formed in the second layer that passes from the first node to the second node with reduced latency such that data transfer between the first router logic and the second router logic with the second data path is faster than data transfer with the first data path.

10. The device of claim 9, wherein:
the first layer has first repeater logic disposed between the first router logic, the second router logic and the third router logic such that the first data path passes from the first node to the second node by way of the third node and the first repeater logic, and
the second layer has second repeater logic such that the second data path passes from the first node to the second node by way of the second repeater logic.

11. A device comprising:
an on-chip network structure having multiple levels including a first level with a first data network and a second level with a second data network that are arranged vertically in a stacked configuration, wherein the first level and the second level include different network structures; and
first intra-layer repeater logic disposed between nodes in the first level, wherein:
the first data network has a first data path formed in the first level that links nodes together by way of the first level including a first node and a second node of the nodes,
the first intra-layer repeater logic is used for data transfer between the nodes in the first level,
the second data network has a second data path formed in the second level that links the nodes together by way of the second level so as to reduce latency related to data transfer between the nodes, and
wherein the second data path links the nodes with reduced latency such that data transfer between the nodes with the second data path bypasses the first data path in the first level and is faster than data transfer between the nodes with the first data path.

12. The device of claim 11, wherein:
the first node has first router logic disposed in the first level,
the second node has second router logic disposed in the first level, and
the second data path is separate and distinct from the first data path.

13. The device of claim 12, wherein:
the nodes include a third node that is separate and distinct from the first node and the second node,
the third node has third router logic disposed in the first level between the first router logic in the first node and the second router logic in the second node.

14. A device comprising:
an on-chip network structure having multiple levels including a first level and a second level arranged vertically in a stacked configuration;
a first data path formed in the first level that links nodes together including a first node and a second node that is separate from the first node; and
a second data path formed in the second level that links the nodes together by way of the second level so as to reduce latency related to data transfer between the nodes,
wherein the first node has first router logic disposed in the first level,
wherein the second node has second router logic disposed in the first level,
wherein the nodes include a third node that is separate and distinct from the first node and the second node,
wherein the third node has third router logic disposed in the first level between the first router logic in the first node and the second router logic in the second node,
wherein the first data path passes from the first node to the second node by way of the third node, and
wherein the second data path passes from the first node to the second node with reduced latency such that data transfer between the first router logic and the second router logic with the second data path is faster than data transfer with the first data path.

15. The device of claim 14, wherein:
the first level has first repeater logic disposed between the first router logic, the second router logic and the third router logic such that the first data path passes from the first node to the second node by way of the third node and the first repeater logic, and
the second level has second repeater logic such that the second data path passes from the first node to the second node by way of the second repeater logic.

16. A method comprising:
providing a multi-layered logic structure by joining multiple layers together having multiple networks including a first layer having a first network and a second layer having a second network that are arranged vertically in a stacked configuration, wherein the first layer and the second layer include different logic structures;
providing first repeater logic disposed between nodes in the first layer, wherein the first repeater logic is used for data transfer between the nodes in the first layer;
linking the nodes together with the first network disposed in the first layer by way of a first data path; and
linking the nodes together with the second network disposed in the second layer by way of a second data path that bypasses the first data path in the first layer and passes through the second layer, which is different than the first data path, so as to reduce latency related to data transfer between the nodes,
wherein the second data path links the nodes with reduced latency such that data transfer between the nodes with the second data path is faster than data transfer between the nodes with the first data path.

17. The method of claim 16, wherein the second layer is separate and distinct from the first layer, wherein the second layer is disposed above the first layer, and wherein the second layer is joined to the first layer with a face-to-face bond (F2FB).

18. The method of claim 16, wherein:

the first network refers to a first on-chip network of first data paths that are formed in the first layer, the second network refers to a second on-chip network of second data paths that are formed in the second layer, and the first data paths are separate and distinct from the second data paths.

19. The method of claim 16, wherein the second network transfers data between the nodes with fewer timing cycles than the first network so as to reduce latency related to data transfer between the nodes.

20. A method comprising:

providing a multi-layered logic structure by joining multiple layers together including a first layer and a second layer arranged vertically in a stacked configuration;

linking nodes together with a first network disposed in the first layer; and linking the nodes together with a second network disposed in the second layer so as to reduce latency related to data transfer between the nodes, wherein the second layer is separate and distinct from the first layer, wherein the second layer is disposed above the first layer, and wherein the second layer is joined to the first layer with a face-to-face bond (F2FB), wherein each layer of the multiple layers has a frontside face and a backside face, and wherein a backside face of the first layer is joined to a backside face of the second layer so as to form the face-to-face bond (F2FB) between the first layer and the second layer.

* * * * *